(No Model.)

F. W. CODDING.
AUTOMATIC BELT TIGHTENER.

No. 283,572. Patented Aug. 21, 1883.

WITNESSES:

INVENTOR:
F. W. Codding
BY Munn & Co.
ATTORNEYS.

UNITED STATES PATENT OFFICE.

FREDERICK W. CODDING, OF BARRE, MASSACHUSETTS, ASSIGNOR TO HIMSELF AND DESPER, ROGERS & CO., OF SAME PLACE.

AUTOMATIC BELT-TIGHTENER.

SPECIFICATION forming part of Letters Patent No. 283,572, dated August 21, 1883.

Application filed June 16, 1883. (No model.)

*To all whom it may concern:*

Be it known that I, FREDERICK W. CODDING, of Barre, in the county of Worcester and State of Massachusetts, have invented a new and Improved Belt-Tightener, of which the following is a full, clear, and exact description.

My invention relates to devices for taking up the slack of power-transmitting belts, and has for its object to provide a simple, efficient, and self-acting device for the purpose.

The invention consists of a ring or ferrule slipped over the doubled end of a joined belt before the belt is adjusted over or upon the driven pulley or wheel, which ring device acts by its gravity to hold the belt closely to the driven pulley with little or no slip, thereby utilizing the power of the driving-pulley to the best advantage, and avoiding the vexatious delays incident to slack belts, and the taking of them up by breaking the joint, cutting a piece from the belt, and rejoining the ends in the usual manner.

The invention includes also a special construction of the ring or ferrule device to provide for equality of wear of the belt on the ring and of the ring on the belt, all as hereinafter fully described and claimed.

Reference is to be had to the accompanying drawings, forming part of this specification, in which similar letters of reference indicate corresponding parts in all the figures.

Figure 1:
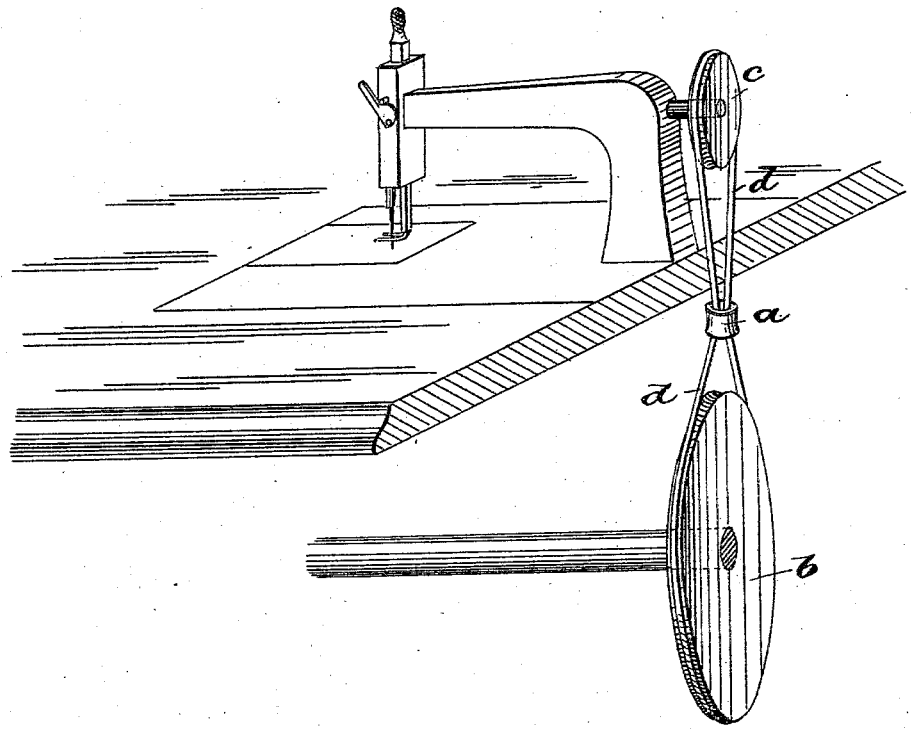
Figure 3:
Figure 2:
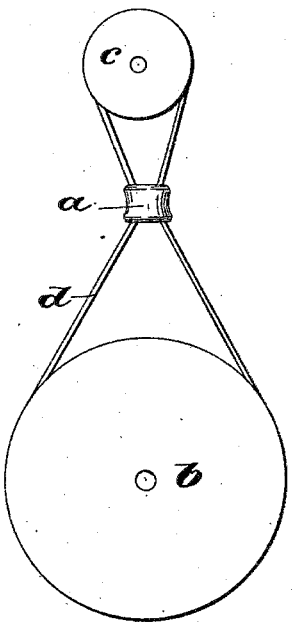

Figure 1 represents, in perspective view, my improvement as applied to the driving-belt of a sewing-machine. Fig. 2 is a side elevation of the tightener and the driving belt and pulleys. Fig. 3 is an enlarged cross-sectional elevation of the tightener, and Fig. 4 is a plan view thereof to the scale of Fig. 3.

Figure 4:
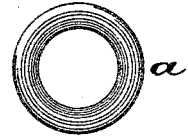

$a$ represents the tightener, which consists of a ring or ferrule, which, when made for use with the round belts of sewing-machines or other like light-running machinery, is about one inch in length and of like internal diameter, the inner wall or face of the tightener being convexed, as in Figs. 3 and 4, the convexity to be proportioned to the relative sizes of the driving-pulley $b$ and driven pulley $c$ to maintain a good surface contact with the belt $d$, which passes over the pulleys to transmit the power, while avoiding any sharp edges, corners, or angles which would tend to unduly wear the belt or impede the best action of the belt and tightener.

In applying the tightener $a$ to the belt $d$, the belt is slipped from pulley $c$ and the tightener passed over the double end or loop of the belt, which is then readjusted to pulley $c$, as shown in Figs. 1 and 2.

The operation of my self-acting tightener, and as fully demonstrated by long-continued experiments, is as follows: As the belt stretches or wears slack its tendency is to draw straight on the driving side and to bow or belly on the other or slack side, and the tightener gradually descends on the belt as its slackness increases, although in a quick speed of the belt the tightener rises and falls alternately, but not so as to allow the belt to slip to any appreciable extent on either pulley, and as the belt travels within the tightener $a$ the convexity of the inner face of the tightener keeps it in rotation around or over both sides of the belt, whereby the tightener wears evenly at all points of contact and the belt suffers no injury by abrasion or cutting.

It will be noted that my improved tightener is simply placed upon the belt and has no connection with any other support, and by its use the delays of frequently taking up the belt are avoided, and the machine to be driven maintains a uniform speed for a prolonged period; and the device, moreover, is simple, may be cheaply made and applied, and is well calculated for durability in use; and while herein more particularly shown and described as applied to the light round belts of sewing-machines, the tightener is also applicable in larger size to the belts of a variety of machines requiring greater power to drive them.

Having thus described my invention, I claim as new and desire to secure by Letters Patent—

1. The combination, with a belt and its driving and driven pulleys, of a self-acting belt-tightener, consisting of a loose ring or ferrule passed over both sides of the belt between said pulleys, substantially as shown and described.

2. The combination, with a belt and its driving and driven pulleys, of a self-acting belt-tightener, consisting of a loose ring or ferrule passed over both sides of the belt between the pulleys, said ring being convexed on its inner or belt-contact face, substantially as shown and described.

FREDERICK W. CODDING.

Witnesses:
CHARLES BRIMBLECOM,
HUMPHREY F. BROOKS.